Patented Apr. 21, 1925.

1,534,019

UNITED STATES PATENT OFFICE.

JAMES BADDILEY, ARNOLD SHEPHERDSON, HERBERT SWANN, JAMES HILL, AND LESLIE GORDON LAWRIE, OF MANCHESTER, ENGLAND, ASSIGNORS TO BRITISH DYESTUFFS CORPORATION LIMITED, OF MANCHESTER, ENGLAND.

DYEING ACETYL CELLULOSE OR FABRICS CONTAINING THE SAME AND NEW PRODUCTS FOR USE THEREIN.

No Drawing.   Application filed October 9, 1924.   Serial No. 742,703.

*To all whom it may concern:*

Be it known that we, JAMES BADDILEY, ARNOLD SHEPHERDSON, HERBERT SWANN, JAMES HILL, and LESLIE GORDON LAWRIE, subjects of the King of England, and residents of Manchester, in the county of Lancashire, England, have invented certain new and useful Improvements in Dyeing Acetyl Cellulose or Fabrics Containing the Same and New Products for Use Therein, of which the following is a specification.

It has been proposed to dye cellulose acetate with acid, basic or direct dyestuffs using a dyestuffs solution containing at least one chloride and one acid with or without the addition of one or more protective colloids.

Another method of dyeing cellulose tri-acetate has been proposed, comprising the use of colloidal solutions of dyes or dye compounds prepared by the addition to the said solution of certain precipitants in the presence of protective colloids.

In our earlier British application for Letters Patent No. 211720 we have described the dyeing of acetyl silk with amino-anthraquinones in which process the addition of an emulsifying agent or protective colloid, for example, soap, Turkey red oil, etc., has been found to be advantageous.

We have now found that in dyeing acetyl silk, of all the protective colloids or dispersing agents available, the condensation products of naphthalene with formaldehyde in sulphuric acid solution or naphthaline sulpho acids with formaldehyde give the best results and enable new products, suited for dyeing acetyl silk with the greatest simplicity, to be placed at the dyers' disposal as hereinafter described. The said naphthalene formaldehyde sulphuric acid condensation products can be prepared as described in British Letters Patent Nos. 4648/11 or 7137/13 but we give below an example of the method which we prefer to adopt.

The new products referred to are obtained by thoroughly mixing together suitable colouring matters having affinity for acetyl silk, and which are substantially insoluble, with the said naphthalene formaldehyde sulphuric acid condensation products and the requisite quantity of water. The products obtained may be termed pastes and behave in the dyebath exactly as if the dyestuff were dissolved in the bath so that the dyer of the acetyl cellulose fibre does not require to take any special precautions and a wide range of colours can be obtained without it being necessary to diazotize and develop on the fibre. If desired these pastes can be dried by evaporation and ground to powder so that the products are available in powder form which are frequently preferred by dyers. These powders can be mixed with direct cotton dyestuffs and the mixtures for dyeing materials consisting partly of acetyl silk and partly of ordinary vegetable fibre.

The following examples illustrate the manner in which we prefer to manufacture the dispersing agent and to prepare the new products and dye according to the new process.

*Example I.*

1 part of naphthalene is sulphonated with 1 part of sulphuric monohydrate for 10 hours at 160° C. The resulting product is diluted with 0.4 parts of water with cooling. At a temperature of 80–85° C., 0.3 parts 40% formaldehyde are added and condensation carried on for 6 hours at 95–100° C. After cooling, dilute with 0.6 parts of water and partially neutralize with 0.6 parts 38% caustic soda solution.

*Example II.*

The dyestuff paste is made up as follows:—

To 10 parts of the dispersing agent obtained as above are gradually added one part of the monoazo dyestuff made by diazotizing paranitraniline and combining with diphenylamine in the usual way. The mixture is stirred well and the dyestuff apparently passes into solution. The product thus obtained can be put on the market and is ready for use by the dyer like a dyestuff paste.

*Example III.*

As an illustration of its application, take, say, 10 pounds of the product obtained as described in Example II for 100 pounds of acetyl silk yarn. Add the dyestuff dispersion mixture to the cold dyebath and after mixing well, enter the yarn, previously wetted out. Work well and raise the temperature gradually to 70–80° C.; salt may be added if desired. Rinse and dry the yarn. It is dyed a bright full yellowish-red shade having highly satisfactory fastness properties.

In a similar manner a dispersion mixture or paste may be prepared from, say, 1 part of 1.4-diaminoanthraquinone (see British Letters Patent No. 211720) and from 5 to 10 parts of the partially neutralized naphthalene sulfonic acid-formaldehyde condensation product prepared as above. Solution is aided by warming if necessary. When clear, the mixture may be poured directly into a dyebath, using, say, the equivalent of one part of the aminoanthraquinone per 100 parts of acetyl silk yarn. The silk is dyed a full bright reddish-violet shade and the dyebath is practically completely exhausted.

We claim:—

1. The improvement in dyeing acetyl silk which consists in intimately mixing substantially insoluble colouring matters, which have affinity for acetyl silk with a naphthalene formaldehyde sulfuric acid condensation product and dyeing with this mixture.

2. The improvement in dyeing acetyl silk which consists in using as a protective colloid and dispersing agent a naphthalene formaldehyde sulfuric acid condensation product having affinity for acetyl silk, all substantially as described.

3. The manufacture of new products for dyeing acetyl silk by intimately mixing substantially insoluble colouring matters having affinity for acetyl silk with a naphthalene formaldehyde sulfuric acid condensation product.

4. As new articles of manufacture the mixture of substantially insoluble colouring matters having affinity for acetyl silk with a naphthalene formaldehyde sulfuric acid condensation product either in paste form or as dry powder.

In testimony whereof, we have hereunto affixed our signatures.

JAMES BADDILEY.
ARNOLD SHEPHERDSON.
HERBERT SWANN.
JAMES HILL.
LESLIE GORDON LAWRIE.